Feb. 16, 1960 E. SALATI 2,925,027
COFFEE INFUSION PREPARING MACHINE WITH HYDROCOMPRESSOR
Filed April 11, 1957 3 Sheets-Sheet 3
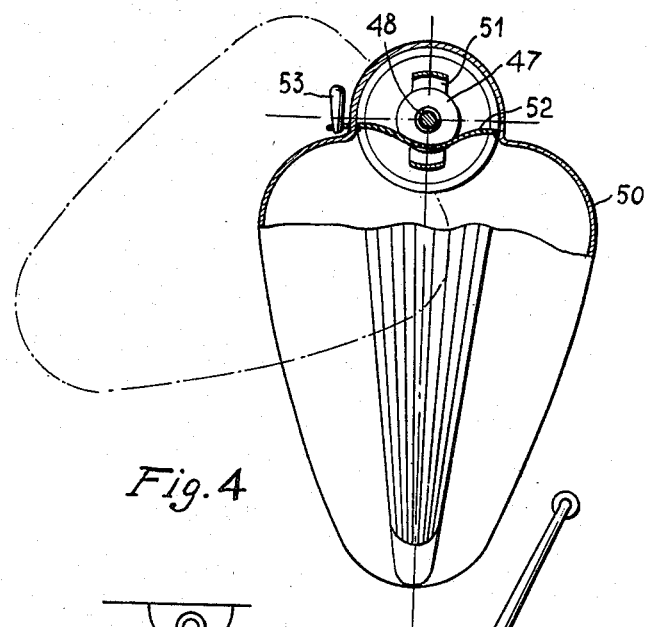
Fig. 4
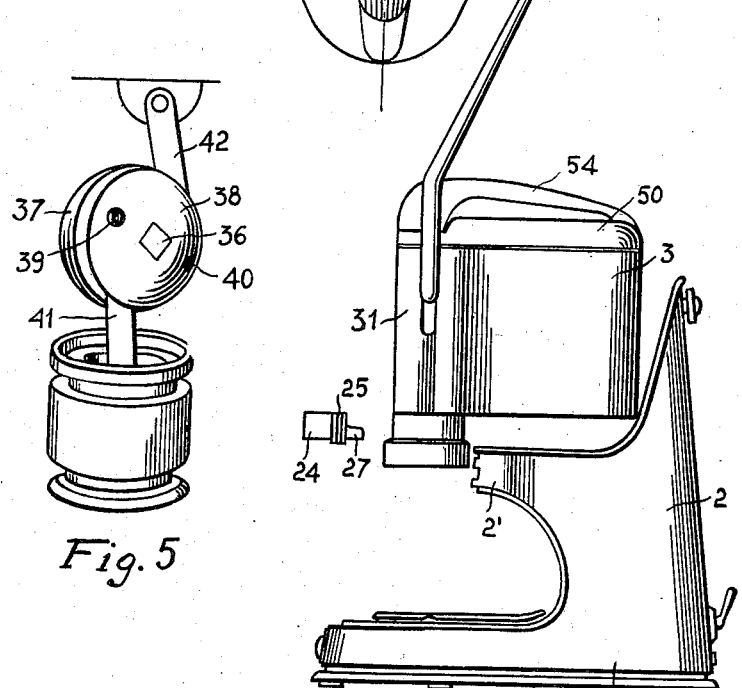
Fig. 5
Fig. 6
Inventor:
Doctor Emidio Salati
BY Michael S. Striker
agt.

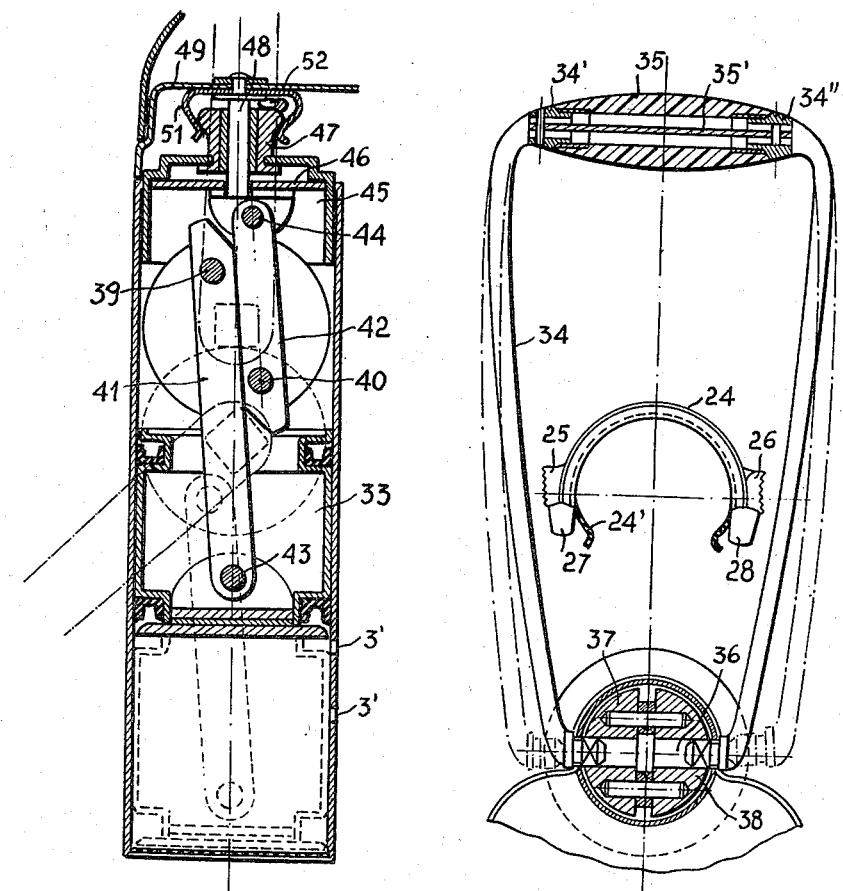

United States Patent Office 2,925,027
Patented Feb. 16, 1960

2,925,027
COFFEE INFUSION PREPARING MACHINE WITH HYDROCOMPRESSOR

Emidio Salati, Milan, Italy

Application April 11, 1957, Serial No. 652,144

Claims priority, application Italy April 23, 1956

6 Claims. (Cl. 99—302)

This invention relates to coffee infusion preparing machines provided with electric heating, and composed of organs that can be disassembled with simple and quick handlings, thus consenting the accessibility to the various elements of the machine, and provided furthermore with a group for the hydrocompression or compression of the hot water through the powdered coffee, the piston of said group being controlled by a kinematism that requires a limited strength onto the controlling lever.

Another object of this invention is to particularly provide for a complete and quick disassembling of all elements composing the part directly interested with the preparation of the coffee infusion, so as to render the accessibility to such elements easy in order to consent the integral cleaning of such elements, with the possibility to take away all coffee powder residue that usually remain deposited on such elements, therein causing putrid emanations due to quick rotting that provoke damaging of the successive infusions causing them to be disagreeable and prejudicial to the users.

A further object of the invention is that to obtain a coffee infusion preparing machine that, although of small sizes, as those for domestic uses, results perfectly stable, particularly during the handling of the lever provided for the compression of the hot water through the coffee powder, such as said lever may be controlled with a limited strength onto it.

A first characteristic of the invention is ensured by the provision of a broiler of convenient shape, connected to the foot part of the coffee machine by means of assembling means that may be easily disassembled, thus consenting the taking away of the boiler, and of all elements connected to it, therein also comprised the cylinder for the compression of the hot water with all elements of which it is composed or to be connected to it. Said boiler is closed at its upper portion by means of a cover held in place by a disengageable notch through a lever of special make and rotatable around a bolt such as to consent the accessibility within the boiler for the cleaning operations.

Another characteristic of this invention is the simple disassembling of all elements disposed within the cylinder, the same being made free by the simple opening of the upper portion cover.

A still further characteristic of this invention is the location and quick taking away of the heating electric resistance. Such device, duly protected and of triangular shape, of which triangle a face is turned upwards, is wound in such manner as to ensure an effective positioning of the spires of the upper portion in a perfectly common plane, and with a perfect adherence to the body of the boiler, the terminals of said resistance being inserted within plugs of a special dielectric material. In this way, after the boiler has been taken away from the coffee infusion preparing machine, also said resistance may be disassembled from the machine by only disengaging said plugs. This kind of assembling consents the easy and quick substitution of the resistance in case of breaking or damaging of the same, or in case of a different feeding voltage of the line.

Under the electric resistance there is foreseen a concave mirror, the purpose of which is to reflect the thermic irradiations that are dispersed from the resistance against the lower portion of the boiler. The resistance bears in its central portion the plug into which the terminals are inserted. The aforesaid mirror is supported by springs that consent an elastic movement of the mirror in order to facilitate the assembling of the boiler, by mastering the strength opposed by the resistance, that thus follows the mirror during its elastic movements consented by the springs.

Still another characteristic of the invention is given by the kinematism that controls the movement of the piston within the group of compression of the water. Said kinematism is composed of two small shafts or piston rods, one of which is hinged on the upper cover of the cylinder, and the other on the piston. The free ends of said piston rods are hinged on an intermediate small lever preferably constituted by two spherical cups or by two circular plates, the radius of which is a little less large as the internal radius of the cylinder; said cups or plates being disposed at a certain reciprocal distance in order to consent the engagement therethrough of said small piston rods. The displacement of the cylinder occurs by controlling a two arm lever that acts onto the arm constituted by two spherical cups thus inducing them into rotation, said lever being engaged with said two cups by means of two square bolts located in opposed position and engaging into seatings of square transversal cut, worked in the central portion of the aforesaid cups or plates, the whole intended so as a limited pressure exerted onto the free end of the lever to be transformed into a considerable throw onto the piston, this being due to the remarkable length difference of the two arms constituting said two arm lever, and to the distance of the articulation axle of last in regard to the rotating bolt of the cup on which the piston rod is hinged.

These and other objects and characteristics of the invention will be better understood by reading the hereinafter reported detailed specification, and looking to the herewith enclosed drawings of illustration, wherein there is explained and shown respectively a non limitative example of embodiment of the invention itself.

Of said drawings:

Figure 2 is an axial cut in larger scale of the hydrocompression group;

Figure 4 is a section along line B—B of Figure 1;

Figure 5 is a perspective view of the kinematism for controlling the piston, and Figure 3 is a section along line A—A of Figure 1;

Figure 6 is a view from the outside of the machine in its main parts after disassembling of the foot part and the group of active organs of the machine itself.

Figure 1:
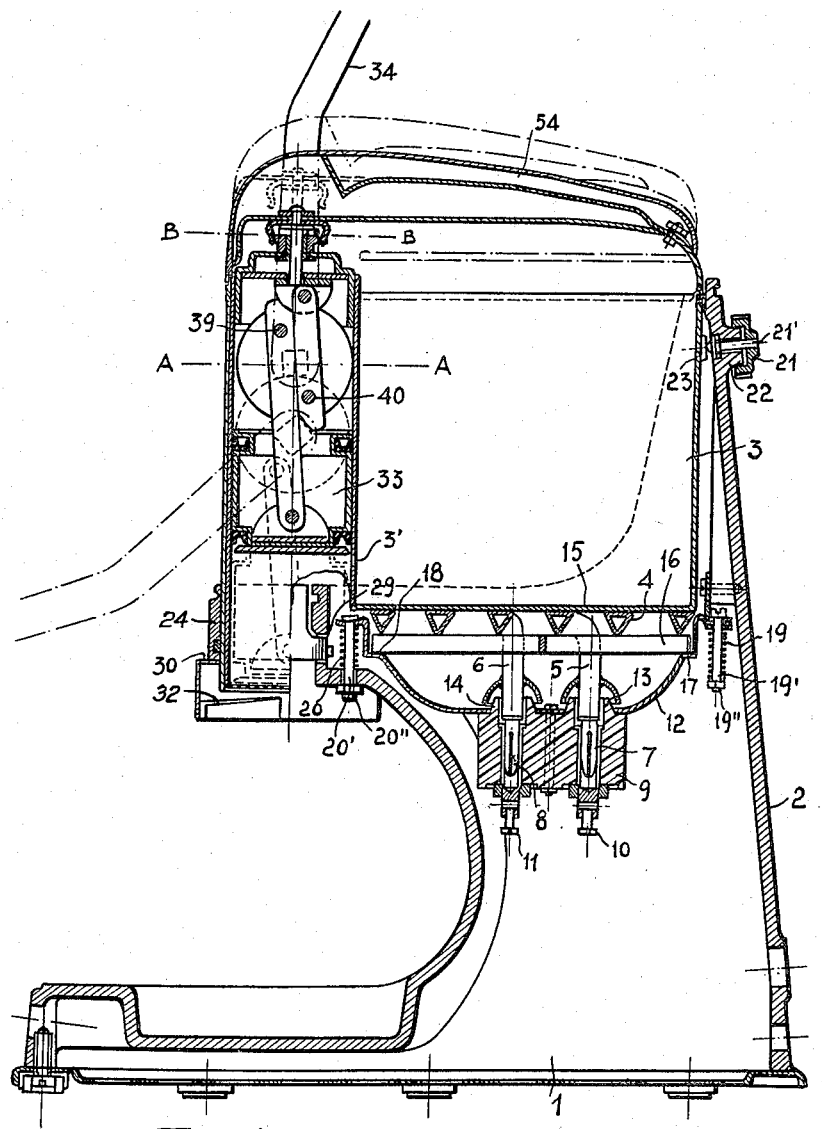
Figure 1 is a view of the coffee infusion preparing machine, partly shown in section along a medium plane of the same.

Referring now more particularly to Figures 1 and 6, the machine subject matter of this invention is composed of a strong foot part 1 obtained from casting in one piece alone, with a supporting arm 2 prolonged upwards in the rear part, and therein made tapered in order to partly surround the boiler 3, which in its body portion is partially bound on its sides by two projecting elements 2'.

The boiler 3 lies on an electric resistance 4 disposed as a plain spiral, the terminals of which 5 and 6 project downwards in order to be inserted into respectively provided connecting pins 7 and 8 cooperating with a plug 9, the body of which is made of dielectric and refractory stuff, for example steatite, and on which there are foreseen the screws 10 and 11 for the fastening of the electric conducting wires.

Plug 9 is centrally held by a mirror 12, concavely shaped, and provided with two narrow holes into which enter the collars 13 and 14 of the plug body 9. Said collars are foreseen to receive the terminals 5 and 6 of the resistance 4.

The protecting covering of resistance 4 presents a triangular section with one face turned upwards, the spires being disposed in such manner that their faces in the upper portion are all on the same plane so as to exactly adhere to the bottom 15 of boiler 3. In order to ensure the plane position of the spires their summits in their inferior position lean on a V bent rod 16, the part constituting the summit of which is supported by a step 17, whilst both the ends are supported by steps 18, all being obtained on the mirror 12.

The mirror 12 leans on a rear spring 19, and on two front springs 20. Said springs are wound respectively around bolts 19' and 20', that are opportunely sustained by the foot part, wherein they are regulated by means of screws respectively 19'' and 20''. The throwing action of said springs on the borders of the mirror is such as to ensure the adherence of the resistance 4 to the bottom 15 of boiler 3.

In the rear highest portion of arm 2 there is foreseen a collar 22 into which penetrates a pivot 21, screwed in said collar and provided with a pin that takes its location in a cavity 23 disposed on the boiler. Said pivot can be screwed or unscrewed in respect with the bushing 21' provided with lateral knurling. The screwing of pivot 21 allows the centering of boiler 3, and cooperates in the fixation of the boiler to the foot part of the machine. In the front part, the boiler is held by a half-ring 24 (Figures 1, 3 and 6) provided with two knurled holding organs 25 and 26 laterally disposed, and with two extremity wedges 27 and 28, and an elastic blade 24' as well, the last also of semi-annular construction. Wedges 27 and 28 are provided for entering grooves 29 provided at the ends of projecting arms 2'. The elastic blade 24' is provided for binding close the cylinder body 31, whilst the lower portion of the half-ring 24 leans on the step 30 of said cylinder 31. By unscrewing pivot 21 and extracting the half-ring 24, by mastering the bending close of blade 24', the boiler 3 is wholly disengaged, and together with it also the cylinder 31 and all the organs that are connected to it, as shown in Figure 6.

The disengagement of boiler and of the other organs allows the direct accessibility to the electric resistance 4, which in this manner can easily be disengaged from its seating by taking away the pins 7 and 8 from their location in plug 9.

Step 30 on the cylinder is foreseen for the necessary enlarging portion in order to permit the bayonet fitting for the filter cup that is provided for receiving the powdered coffee, said filter cup being held by biased planes 32.

The cylinder mantle 31 is an integral part of boiler 3, and said cylinder communicates with said boiler by means of holes 3' that are opened when the piston is raised, to permit hot water to fill the cylinder space in order to be expelled by the action of said piston 33 during its downward stroke.

Piston 33 is controlled by a lever 34 constituted by two arms that on one side are connected to a handle 35 (Figure 3), and on the other side engage through square bolts respective seatings of square transversal cut 36 provided in the spherical cups 37 and 38. In the inner portion of handle 35 takes place an elastic blade 35' the ends of which engage the ends of the lever arms 34, that present elastic packings 34' and 34'' in order to facilitate the opening of said lever arms 34 with the view to disengage the square bolts of the last from the seatings 36, in the manner shown by dotted lines in Figure 3.

The spherical cups 37 and 38 are rigidly connected to each other by means of two parallel bolts 39 and 40 (Figures 1, 2, 3 and 5) and are held at a distance from said bolts. On bolt 39 is hinged the end of a piston rod 41, whilst on bolt 40 there is hinged a piston rod 42. Piston rod 41 has its other end fastened on the hinge 43 of piston 33, whilst piston rod 42 has its end fastened on hinge 44, situated under the cup 45 that forms the ceiling portion of cylinder.

When the piston is in its uppermost position, piston rods 41 and 42 are positioned side by side. Lever 34, on actuation, imparts to the joined members 37, 38 a compound rotary and linear progressive movement in the downward direction, so that piston rod 41 exerts a downward directed force on piston 33 proportional to the force acting on lever 34. The final position of cups 37 and 38, of the piston rod 41 and of the piston 33 is shown in dotted lines in Figures 1 and 2.

The upper or ceiling portion of cylinder 31 is constituted by a cup 45 that is bayonet engaged within the inner portion of said cylinder or engaged in such manner as to resist to the throw onto it, as exerted by the piston rod 42 when the lever 34 is controlled. A bottom plate 46 bears the hinge 44. The cup bottom 45 is bored, and provided with a small handle 47 presenting an axial bore through which a bolt 48 passes, the same being connected to the metal sheet 49 of the cover 50 of boiler 3. The upper end of said small handle 47 is reinforced, and besides this reinforcement the ends opportunely shaped of an elastic blade 51 (Figures 1, 2 and 4) will act in order to ensure the even closing of the cover of boiler 3. To this end, the small blade 51 is fastened to the metal sheet 49 by means of a collar supported by said bolt 48 itself. On said small handle 47 there is foreseen underneath said blade 51 a shaft 52 the ends of which enter appropriate holes made on the lateral walls of the cover 50, whilst an end projects outwards in order to bear a small lever 53. Corresponding to said small handle 47, shaft 52 is provided with a bending that interferes during the movement upwards of small handle 53 with the small handle 47 that constitutes a fulcrum, so constraining in upwards movement the ends of said shaft, and therefore causes the raising up of the cover by mastering the strength that fastens the small blade 51, thus obtaining the disengagement of the cover, which thus can be rotated around bolt 48, as shown in dotted lines in Figure 4.

In Figure 1 there is shown also in dotted lines the raised up position of the cover after the disengagement of the small blade 51. The rotation of the cover 50 allows the accessibility of the internal part of boiler 3, and the according operation is very quick, as stated hereinabove, so facilitating the immission and changing of the water in said boiler, and also rendering more rapid and easy all operations of cleaning of the boiler itself. Of course, the cover can also be wholly disengaged by simply disengaging the bolt 48.

Above the cover there is foreseen a handle 54, that is disposed apart from said cover in order to be isolated at least partially from the cover itself and in order to be not brought to such a temperature as to impede the handling by hands.

The taking away of the cover 50 permits the accessibility to the internal organs of the cylinder, by disengaging through a simple rotation the cup 45 and by raising it in upwards movements so as to draw together with it the piston rods 41 and 42, the cups 37 and 38 and the piston 33 itself, as shown in Figure 5. The taking away of these organs is possible after previous disengagement of the lever arms 34, in the aforesaid manner.

Of course the hereinabove described coffee infusion preparing machine, as also illustrated in the accompanying drawings, is not limitative of the invention, the same being such as can be embodied in different other manners. Furthermore, said machine can be manufactured so as to comprise more groups for the compression of the hot water through the coffee powder, so that a larger coffee infusion preparing machine is obtained for bars, coffee houses and the like public locals. One large water boiler may be provided for and connected to a plurality of coffee infusion devices according to the present invention, or one hot water collector may be arranged to feed a number of coffee infusion devices.

What I claim is:

1. In a pressure infusion machine, a combined water container and infusion pump unit comprising a housing forming a water container and an upright pump cylinder open at the top and having a bottom discharge end as well as passage means whereby said container communicates with said pump cylinder and having apertures in the cylinder wall accessible from the outside of said housing; a common cover member for said combined water container and pump cylinder; means removably securing said common cover member to said housing; a pump unit comprising a closure member for the top end of said pump cylinder, means for removably securing said closure member to said pump cylinder, a pump piston slidable in the lower portion of said cylinder, piston actuating means mounted in the upper portion of said cylinder operatively interconnecting said closure member and said piston and operable so as to be extendable and retractable to effect reciprocation of said piston and so that upon removal of said common cover member the pump unit can be removed from said cylinder together with said closure member; and operating means for said pump unit having portions adapted to extend through said apertures in the cylinder wall and engage said piston actuating means of the pump unit for actuating said piston, said operating means being detachable from said pump unit whenever desired.

2. In a pressure infusion machine, a combined water container and infusion pump unit comprising a housing forming a water container and an upright pump cylinder open at the top and having a bottom discharge end as well as passage means whereby said container communicates with said pump cylinder and having apertures in the cylinder wall accessible from the outside of said housing; a pump unit comprising a closure member for the top end of said pump cylinder, means for removably securing said closure member to said pump cylinder, a pump piston slidable in the lower portion of said cylinder, a circular member disposed in the upper portion of said cylinder with its axis transversal to the axis of the cylinder for movement in said cylinder while guided therein against lateral displacement, first eccentric pivot means provided on said circular member, a first link having one end connected to said circular member turnable about said first pivot means and the opposite end pivotally connected to said closure member of the cylinder, second eccentric pivot means provided on said circular member substantially opposite to said first pivot means, a second link having one end connected to said circular member turnable about said second pivot means and the opposite end pivotally connected to said piston, so that rotation of said circular member in respective opposite directions will reciprocate the piston, and so that the pump unit can be removed from said cylinder together with said closure member; and operating means for said pump unit having portions adapted to extend through said apertures in the cylinder wall and engage said piston actuating means of the pump unit for actuating said piston, said operating means being detachable from said pump unit whenever desired.

3. In a pressure infusion machine, a combined water container and infusion pump unit comprising a housing forming a water container and an upright pump cylinder open at the top and having a bottom discharge end as well as passage means whereby said container communicates with said pump cylinder and having apertures in the cylinder wall accessible from the outside of said housing; a pump unit comprising a closure member for the top end of said pump cylinder, means for removably securing said closure member to said pump cylinder, a pump piston slidable in the lower portion of said cylinder, a pair of substantially identical concentric circular members spaced a predetermined distance from each other disposed in the upper portion of said cylinder with their axis transversal to the axis of the cylinder for movement therein while guided against lateral displacement, a first eccentric pivot member interconnecting said circular members, a first link having one end between said circular members turnable about said first pivot member and the opposite end pivotally connected to said closure member of the cylinder, a second eccentric pivot member interconnecting said circular members opposite to said first pivot member, a second link having one end between said circular members turnable about said second pivot member and the opposite end pivotally connected to said piston, so that rotation of said circular members in respective opposite directions will reciprocate the piston, and so that the pump unit can be removed from said cylinder together with said closure member; and operating means for said pump unit having portions adapted to extend through said apertures in the cylinder wall and engage said piston actuating means of the pump unit for actuating said piston, said operating means being detachable from said pump unit whenever desired.

4. In a pressure infusion machine, a combined water container and infusion pump unit comprising a housing forming a water container and an upright pump cylinder open at the top and having a bottom discharge end as well as passage means whereby said container communicates with said pump cylinder and having a pair of oppositely disposed apertures in the cylinder wall accessible from the outside of said housing; a pump unit comprising a closure member for the top end of said pump cylinder, means for removably securing said closure member to said pump cylinder, a pump piston slidable in the lower portion of said cylinder, a pair of substantially identical concentric circular members spaced a predetermined distance from each other disposed in the upper portion of said cylinder with their axis transversal to the axis of the cylinder for movement therein while guided against lateral displacement, a first eccentric pivot member interconnecting said circular member, a first link having one end between said circular members turnable about said first pivot member and the opposite end pivotally connected to said closure member of the cylinder, a second eccentric pivot member interconnecting said circular members opposite to said first pivot member, a second link having one end between said circular members turnable about said second pivot member and the opposite end pivotally connected to said piston, so that rotation of said circular members in respective opposite directions will reciprocate the piston, and so that the pump unit can be removed from said cylinder together with said closure member; and a U-shaped operating member for said pump unit having a pair of shanks resiliently deflectible from one another with terminal portions adapted to extend through respective opposite apertures in the cylinder wall when sprung into engagement each with one of said circular members so that oscillating said operating member will rotate said circular members and thereby actuate the pump unit, said shanks being deflectible away from each other to effect their release from said circular members of the pump unit and from said cylinder.

5. In a pressure infusion machine, a combined water container and infusion pump unit comprising a housing forming a water container and an upright pump cylinder open at the top and having a bottom discharge end as well as passage means whereby said container communicates with said pump cylinder and having apertures in the cylinder wall accessible from the outside of said housing; a common cover member for said combined water container and pump cylinder; a pump unit comprising a closure member for the top end of said pump cylinder, means for removably securing said closure member to said pump cylinder, a pump piston slidable in the lower portion of said cylinder, piston actuating means mounted in the upper portion of said cylinder operatively interconnecting said closure member and said piston and operable so as to be extendable and retractable to effect reciprocation of said piston and so that upon removal of said common cover member the pump unit can be removed from said cylinder together with said closure member; operating means for said pump unit having portions adapted to extend through said apertures in the cylinder wall and engage said piston actuating means of the pump unit for actuating said piston, said operating means being detachable from said pump unit whenever desired; and pivot means for pivotally mounting said common cover member on said closure member of the cylinder so arranged that said cover member can be lifted from its closing position on said housing coaxially with said pivot means to clear said housing and thereupon to be swung about said pivot means to provide access to said container.

6. In a pressure infusion machine, a combined water container and infusion pump unit comprising a housing forming a water container and an upright pump cylinder open at the top and having a bottom discharge end as well as passage means whereby said container communicates with said pump cylinder and having apertures in the cylinder wall accessible from the outside of said housing; a common cover member for said combined water container and pump cylinder; a pump unit comprising a closure member for the top end of said pump cylinder, means for removably securing said closure member to said pump cylinder, a pump piston slidable in the lower portion of said cylinder, piston actuating means mounted in the upper portion of said cylinder operatively interconnecting said closure member and said piston and operable so as to be extendable and retractable to effect reciprocation of said piston and so that upon removal of said common cover member the pump unit can be removed from said cylinder together with said closure members; operating means for said pump unit having portions adapted to extend through said apertures in the cylinder wall and engage the pump unit therein for actuating the same, said operating member being detachable from said pump unit whenever desired; pivot means for pivotally mounting said common cover member on said closure member of the cylinder so arranged that said cover member can be lifted from its closing position on the housing coaxially with said pivot means to clear said housing and thereupon be swung about said pivot means to provide access to said container; and resilient gripping means provided in the region of said pivot means effective to retain said cover member in closing position upon said housing and arranged so as to allow the cover member to be lifted from its closing position overcoming the resistance of said gripping means thereby releasing said cover member for turning movement about said pivot means.

References Cited in the file of this patent

UNITED STATES PATENTS

| | | |
|---|---|---|
| 41,974 | Class et al. | Mar. 22, 1864 |
| 176,417 | Armstrong | Apr. 25, 1876 |
| 711,144 | Wright | Oct. 14, 1902 |
| 1,499,007 | Edwards | June 24, 1924 |
| 1,821,218 | Hobart | Sept. 1, 1931 |
| 2,026,234 | Knurtila | Dec. 31, 1935 |
| 2,091,499 | Brown | Aug. 31, 1937 |
| 2,581,343 | Ames | Jan. 8, 1952 |
| 2,664,495 | Wehrli | Dec. 29, 1953 |
| 2,678,379 | Fry | May 11, 1954 |
| 2,681,622 | Titus | June 22, 1954 |
| 2,691,717 | Huck | Oct. 12, 1954 |
| 2,798,423 | Klausner | July 9, 1957 |

FOREIGN PATENTS

| | | |
|---|---|---|
| 1,085,498 | France | July 28, 1954 |
| 718,965 | Great Britain | Nov. 24, 1954 |
| 726,272 | Great Britain | Mar. 16, 1955 |